United States Patent [19]

Kabe

[11] Patent Number: 4,775,422
[45] Date of Patent: Oct. 4, 1988

[54] METHOD OF CLEANING SOLDERING IRON AND DEVICE THEREFOR

[75] Inventor: Atsushi Kabe, Hachioji, Japan

[73] Assignee: Asahi Chemical Research Laboratory Co., Ltd., Japan

[21] Appl. No.: 591,880

[22] Filed: Mar. 21, 1984

[51] Int. Cl.$^4$ ............................................... B08B 7/00
[52] U.S. Cl. ..................................... 134/7; 15/209 C; 15/210 R; 15/236.01; 206/526; 206/499; 206/584
[58] Field of Search ....................... 206/526, 499, 584; 134/6, 7; 15/209 C, 210 R, 236, 236 A

[56] References Cited

U.S. PATENT DOCUMENTS

| | | | |
|---|---|---|---|
| 2,213,367 | 9/1940 | Kuehl | 15/236 A |
| 3,047,136 | 7/1962 | Graham | 206/584 |
| 3,481,455 | 12/1969 | Graham et al. | 206/584 |
| 3,948,678 | 4/1976 | Dezzani | 134/6 |

Primary Examiner—H. M. S. Sneed
Assistant Examiner—Sharon T. Cohen
Attorney, Agent, or Firm—Robert F. Ziems

[57] ABSTRACT

The invention relates to a method and a device of cleaning a soldering iron having melted solder attached thereto in which the method includes sticking the soldering iron into irregularly entangled strip elements which may be continuous, heatproof and elastic, and axially reciprocating the soldering iron in the entangled strip elements to scrape the melted solder off the soldering iron by means of the edges of the strip elements, whereby the scraped-off melted solder drops from the soldering iron as these are cooled and hardened by the strip elements. On the other hand, the device includes irregularly entangled strip elements which may be continuous, heatproof and elastic, and a case for accommodating therein the entangled strip elements, said case having a bottom and being open at the top thereof so that the strip elements may be operatively accessible thereat, and said irregularly entangled strip elements being so formed as to cooperate with the soldering iron to scrape the melted solder off the soldering iron.

3 Claims, 2 Drawing Sheets

METHOD OF CLEANING SOLDERING IRON AND DEVICE THEREFOR

BACKGROUND OF THE INVENTION

The invention relates to a method of cleaning a soldering iron and a device therefor, and more particularly relates to such a method and such a device for easily cleaning a soldering iron having melted solder attached thereto during the soldering operation by means of irregularly entangled strip elements.

The soldering iron, which is generally used in a factory for assembling electronic elements and the like, has a copper core bar plated with nickel or iron, and therefore the essential part will not be oxidized as the soldering iron is used, and there is no need to polish the essential part with a rasp and the like.

For this reason, the soldering iron 1 has been cleaned of the melted solder, as shown in FIG. 1, by rubbing the pointed part against a sponge 3 impregnated with water and accommodated in a case 2. Though the sponge 3 is porous and comparatively thin, it has generally a considerable resistance against the insertion of the soldering iron 1. Thus it has been actually impossible to clean the soldering iron 1 of the melted solder by simply sticking the soldering iron 1 into the sponge 3. Therefore in order to clean the soldering iron 1 of melted solder 4, it has been required at first to press one side of the soldering iron 1 against the sponge 3 as shown in FIG. 1, and then to reciprocatingly move the soldering iron in the axial direction as indicated with arrow marks A and B, and further to rotate the soldering iron 1 as indicated by arrow marks C and D. In fact, such a cleaning operation is troublesome and time consuming. Especially the rotation of the soldering iron 1 will add to the fatigue of the operator. On the other hand, the porous sponge 3 is clogged with the hardened solder pieces and other impurities and becomes useless in a comparatively short period of time. This is rather uneconomical. Moreover it is troublesome to always take care of furnishing the sponge 3 with water each time the soldering operation is made. Thus the conventional cleaning operation has been a hindrance in heightening the efficiency of the manual soldering operation.

BRIEF SUMMARY OF THE INVENTION

The invention has been provided to eliminate the defects and disadvantages of the prior art. It is therefore a primary object of the invention to easily and immediately clean the soldering iron of the melted solder only by axially reciprocating the soldering iron while the latter is stuck into a cleaning device of the invention. For attaining this object, the operator is required simply to stick the soldering iron into irregularly entangled strip elements which may be preferably continuous, heatproof and elastic. In this case, the operator is not required to turn the soldering iron around the axis thereof, thereby decreasing the fatigue of the operator in the soldering operation. It is another object of the invention to drop the melted solder pieces downwardly of the soldering iron as these pieces are cooled by the entangled strip elements, to thereby provide a cleaning device which may be almost permanently used and of a lower cost. It is still another object of the invention to eliminate the use of water in the cleaning device of the invention to thereby simplify the handling of the cleaning device and to heighten the efficiency of the soldering operation.

In short, the method of the invention comprises the steps substantially of sticking a soldering iron with melted solder pieces attached thereto into irregularly entangled strip elements which may be continuous, heatproof and elastic; axially reciprocating the soldering iron in the entangled strip elements to scrape the melted solder pieces off the soldering iron by means of the edges of the entangled strip elements, whereby the melted solder pieces are dropped downwardly of the soldering iron as the melted solder pieces are cooled and hardened by the entangled strip elements. On the other hand, the device of the invention substantially comprises irregularly entangled strip elements which may be continuous, heatproof and elastic; a case for accommodating therein the entangled strip elements, said case being open at the upper end thereof so that the entangled strip elements are accessible at the opened end of the case, and said entangled strip elements being so formed as to cooperate with a soldering iron having the melted solder pieces attached thereto to scrape the solder pieces off the soldering iron as the latter is reciprocatingly moved in the axial direction thereof in the entangled strip elements.

The other features and advantages of the invention will be apparent from the following description of the preferred embodiment in reference to the attached drawings, in which.

DETAILED DESCRIPTION OF THE INVENTION

Figure 1:
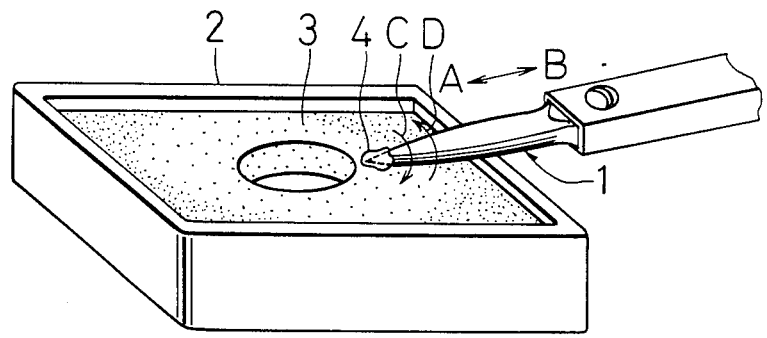
FIG. 1 is a perspective view of a conventional soldering iron cleaning device showing the constituent elements thereof and the cleaning method of the soldering iron.
Figure 2:
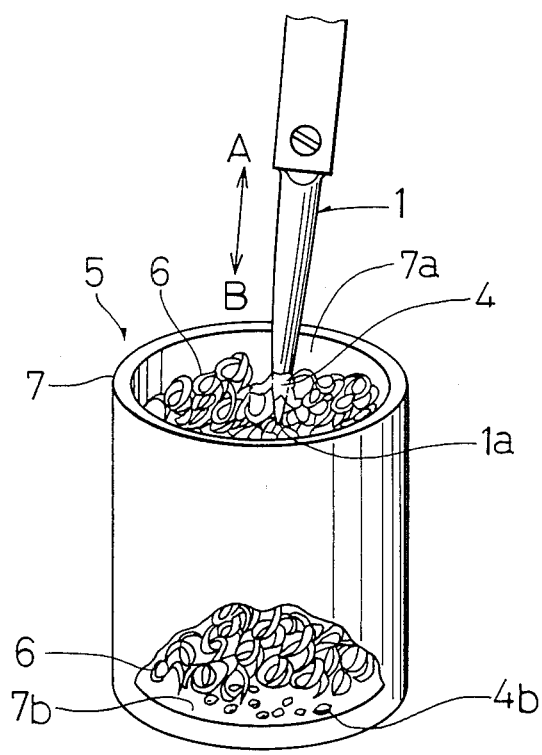
FIG. 2 is a perspective view of a soldering iron cleaning device showing the constituent elements thereof partly in section and the cleaning method of the soldering iron in accordance with the present invention.
Figure 3:
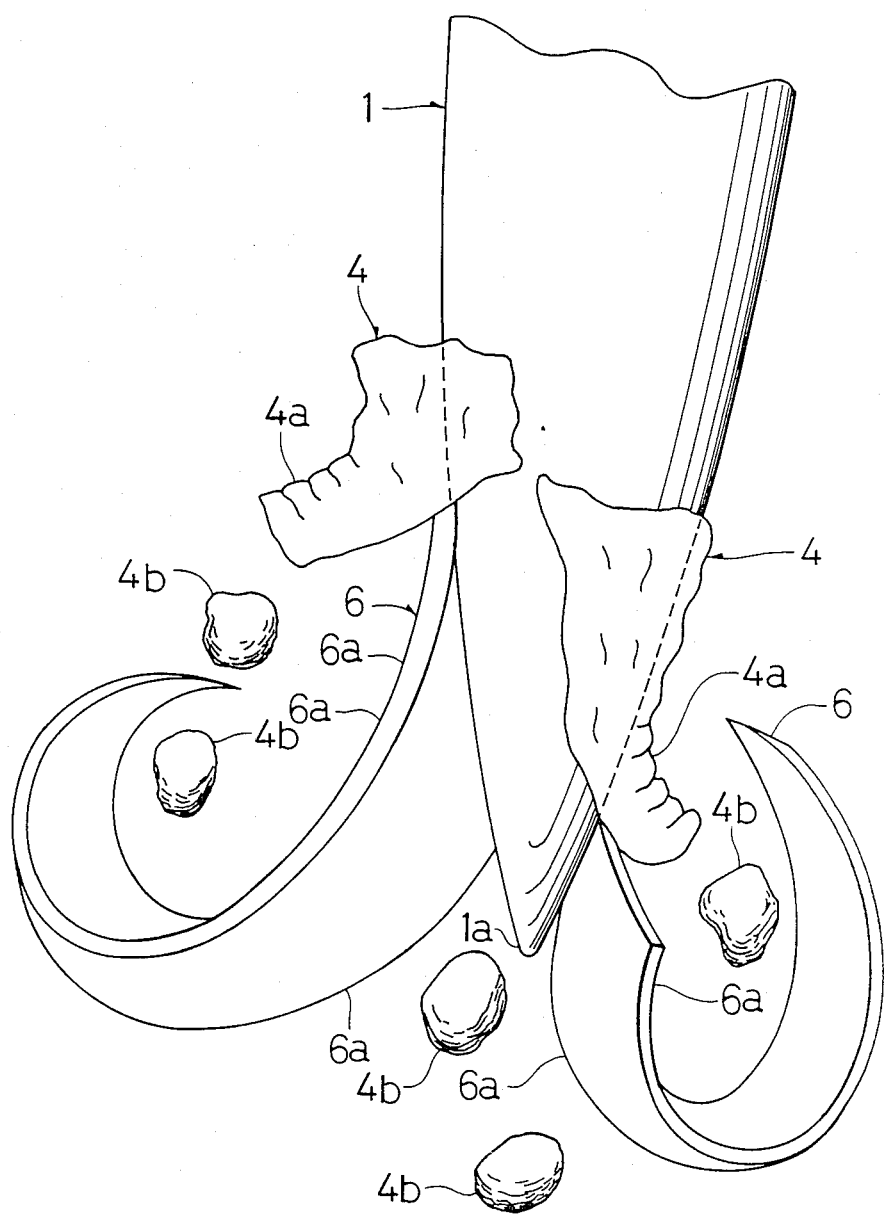
FIG. 3 is an enlarged perspective view of the elements of the invention showing the elements in cooperation with a soldering iron for scraping the solder pieces off the soldering iron.

In reference to FIG. 2, a soldering iron cleaning device 5 of the invention substantially comprises irregularly entangled strip elements 6 which may be preferably continuous, heatproof and elastic, and a case 7 of a substantial depth for accommodating therein the entangled strip elements 6. The case 7 has a bottom 7b and is open at the top 7a thereof so that the entangled strip elements 6 in the case 7 may be accessible. Thus the soldering iron cleaning device 5 is so formed as to clean the soldering iron 1 of melted solder pieces 4 when the soldering iron 1 with the melted solder pieces 4 being attached thereto is stuck into the entangled strip elements 6 and is axially reciprocated. The strip elements 6 may preferably be made of thinned pieces of brass or stainless steel having side edges formed thereon and being free from rust. The strip elements may also be a metal scrubbing brush generally available on the market to polish pans and pots. On the other hand, the case 7 may be an earthenware or may preferably be made of glass, metallic materials or heatproof plastics, and the configuration is not limited to the cylindrical one as shown.

With such a structure of the invention as mentioned above, the operation is as follows: In reference to FIGS.

2 and 3, the irregularly entangled strip elements 6 in the case 7 provide a multiplicity of loops or spaces. When the soldering iron 1, which has melted solder 4 attached thereto, is stuck into the strip elements 6, the soldering iron 1 is at the pointed end 1a thereof passed through the loops of the strip elements 6. Then if the soldering iron 1 is axially reciprocated, the melted solder 4 attached to the soldering iron 1 is scraped with the edges 8a of the strip elements 6 and are taken away from the soldering iron 1. Thus the melted solder 4 scraped off from the soldering iron 1 are dropped downwardly of the iron as these are cooled by the strip elements 6, and are hardened into particles 4b at the bottom 7b of the case 7. The melted solder 4 will not be attached to the strip elements 6 made of a material, for example, such as brass, because the flux of solder is vaporized by the heat of the soldering iron 1.

Thus according to the soldering iron cleaning device 5 of the invention, the soldering iron 1 can be cleaned of the melted solder 4 attached thereto by merely sticking the soldering iron into the irregularly entangled strip elements 6 and then by axially reciprocating the same. Moreover since the melted solders will not be attached to the strip elements 6, the strip elements may be permanently effective. Further the cleaning device 5 itself may be easily cleaned up by taking out the strip elements 6 from the case 7 and then by cleaning the case of the solder particles 4b.

The invention being thus described, it will be obvious that the same may be modified in many ways. Such modifications are not to be regarded as a departure from the sprit and scope of the invention, and may be included within the scope of the following claims.

What is claimed is:

1. A method of removing melted solder from a soldering iron comprising the steps of inserting the soldering iron into a mass consisting essentially of irregularly entangled elastic strip elements having edges; and axially reciprocating the soldering iron in the entangled strip elements to scrape the melted solder off the soldering iron by means of the edges of the strip elements, whereby scraped-off pieces of melted solder drop from the soldering iron as said pieces are cooled and hardened by the strip elements.

2. A device for cleaning a soldering iron of melted solder attached thereto comprising a mass consisting essentially of elastic strip elements, each of said strip elements having a first surface and an opposed second surface, each of said surfaces defining a length and a width, and edges between said first and second surfaces; and a case for accommodating therein the entangled strip elements, said case having a bottom and being open at the top so that the strip elements may be operatively accessible, and said irregularly entangled strip elements being so formed as to cooperate with the soldering iron having the melted solder attached thereto to scrape the melted solder off the soldering iron.

3. A device as defined in claim 2, wherein said irregularly entangled strip elements are made of brass or stainless steel and provide a multiplicity of loops having edges formed therearound.

* * * * *